(12) United States Patent
Fidler

(10) Patent No.: US 9,491,191 B2
(45) Date of Patent: Nov. 8, 2016

(54) MULTICAST MESSAGE UPDATE

(71) Applicant: HEWLETT-PACKARD DEVELOPMENT COMPANY, L.P., Houston, TX (US)

(72) Inventor: Mark W Fidler, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/425,592

(22) PCT Filed: Sep. 26, 2012

(86) PCT No.: PCT/US2012/057176
§ 371 (c)(1),
(2) Date: Mar. 3, 2015

(87) PCT Pub. No.: WO2014/051555
PCT Pub. Date: Apr. 3, 2014

(65) Prior Publication Data
US 2015/0222651 A1   Aug. 6, 2015

(51) Int. Cl.
*H04L 29/06* (2006.01)
*H04L 12/18* (2006.01)
*H04L 12/24* (2006.01)
*H04L 29/12* (2006.01)

(52) U.S. Cl.
CPC ....... *H04L 63/1425* (2013.01); *H04L 12/1863* (2013.01); *H04L 12/1877* (2013.01); *H04L 12/1886* (2013.01); *H04L 41/082* (2013.01); *H04L 41/0816* (2013.01); *H04L 61/2069* (2013.01); *H04L 63/1408* (2013.01); *H04L 61/6004* (2013.01)

(58) Field of Classification Search
USPC .......................... 727/22; 713/100, 160, 163
See application file for complete search history.

(56) References Cited

U.S. PATENT DOCUMENTS

| | | | |
|---|---|---|---|
| 5,818,838 A | 10/1998 | Backes et al. | |
| 7,013,389 B1 * | 3/2006 | Srivastava | H04L 9/0822 713/163 |
| 7,340,597 B1 * | 3/2008 | Cheriton | G06F 21/554 713/100 |
| 2003/0084320 A1 | 5/2003 | Tarquini et al. | |
| 2005/0076245 A1 | 4/2005 | Graham et al. | |
| 2005/0246767 A1 | 11/2005 | Fazal et al. | |
| 2007/0088948 A1 | 4/2007 | Ji et al. | |
| 2008/0059798 A1 | 3/2008 | Fedronic et al. | |
| 2009/0138577 A1 | 5/2009 | Casado et al. | |

(Continued)

FOREIGN PATENT DOCUMENTS

WO   WO-2011/098123 A1   8/2011

OTHER PUBLICATIONS

"OpenFlow 1.X Discussion", 2011.
Extended European Search Report, EP Application No. 12885454.4, Date: Mar. 24, 2016, pp. 1-9.

*Primary Examiner* — Jason Lee
(74) *Attorney, Agent, or Firm* — Hewlett Packard Enterprise Patent Department

(57) ABSTRACT

An example controller comprises a management module to (i) establish a secure channel with a network infrastructure device; (ii) provide a multicast group address to the network infrastructure device via the secure channel; (iii) detect a network event; end (iv) generate an update to provide to the network infrastructure device via a multicast message with the destination address set to the multicast group address.

15 Claims, 6 Drawing Sheets

(56) References Cited

U.S. PATENT DOCUMENTS

| | | |
|---|---|---|
| 2010/0257263 A1 | 10/2010 | Casado et al. |
| 2011/0271007 A1 | 11/2011 | Wang et al. |
| 2012/0147898 A1 | 6/2012 | Koponen et al. |
| 2013/0007231 A1* | 1/2013 | Forssell ............... H04L 41/082 709/221 |

* cited by examiner

MULTICAST MESSAGE UPDATE

BACKGROUND

Networks architectures are beginning to transition to Software Defined Networks (SDNs), where among other things a controller (e.g., a controller based on the OpenFlow specification) interacts with network infrastructure devices (e.g., switches and access points) to "control" communication parameters associated therewith and/or to dictate the behavior of the network infrastructure devices that are handling the actual data traffic. The control may be on all aspects of communication to and from the network infrastructure devices, and, in some instances, multiple controllers may be utilized to interact with the network infrastructure devices and to control various functions (e.g., security, authentication, initialization, etc.).

BRIEF DESCRIPTION OF THE DRAWINGS

Examples are described in the following detailed description and in reference to the drawings, in which.

DETAILED DESCRIPTION

Figure 1:
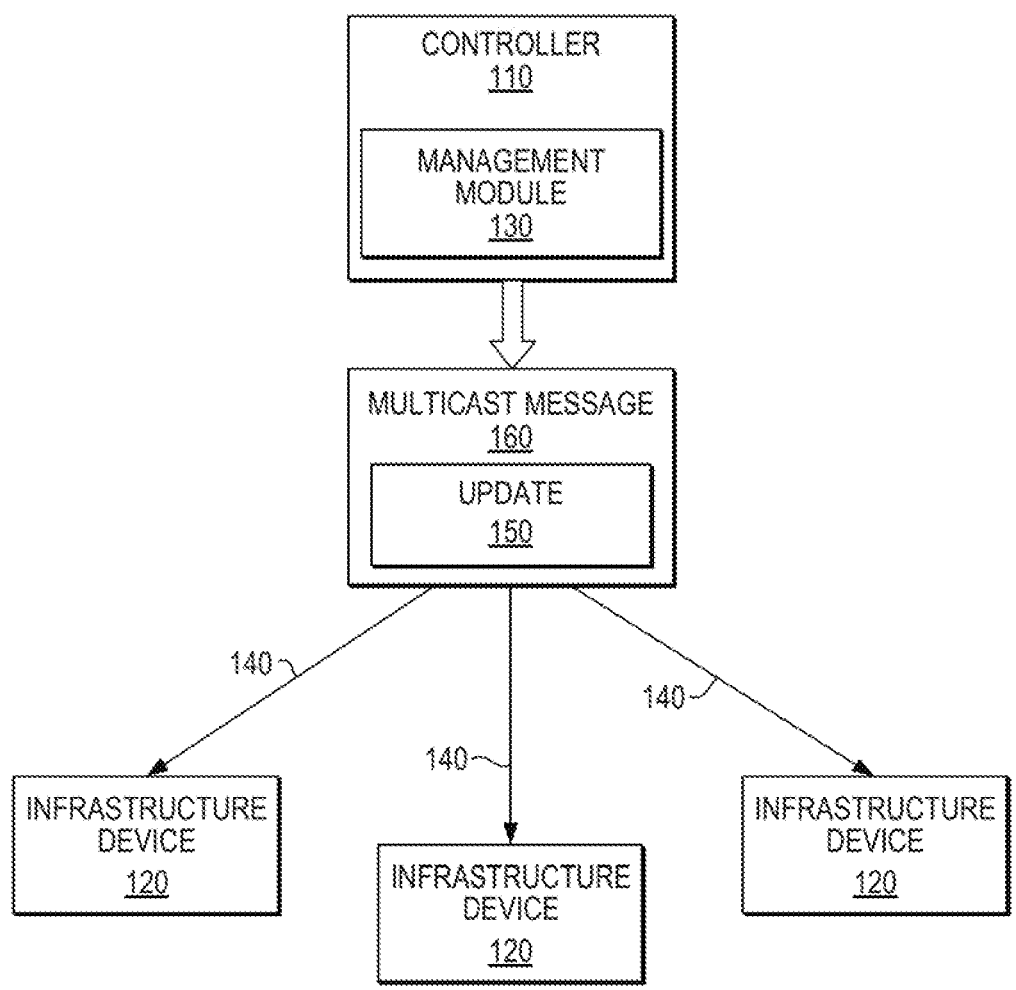
FIG. 1 depicts an example system in accordance with an implementation.

Various aspects of the present disclosure are directed to providing updates to network infrastructure devices in an efficient and effective manner. More particularly, various aspects of the present disclosure are directed to providing global and/or group-specific updates from at least one controller to a plurality of network infrastructure devices by utilizing multicast messaging techniques.

As mentioned above, SDNs are an emerging architecture in the networking technology space, and these architectures utilize a controller to 'control' parameters associated with network infrastructure devices in the controller's domain. For example, the controller may provide periodic updates regarding allowed and/or prohibited activities to network infrastructure devices like switches and access points. This control is typically conducted on a device-by-device basis, where the controller communicates separately with each network infrastructure device in a point-to-point manner. That is, if the controller desires to send a global update (e.g., a security update in response to a detected security threat), the controller separately transmits the update to each network infrastructure device. While this approach may be satisfactory for smaller networks, the approach may be inefficient for larger networks. For example, in a network with 1500 switches in a controller's domain, the controller would have to transmit 1500 separate updates to perform the global update. This approach is inefficient because, at a minimum, it utilizes a large amount of the controller's processing bandwidth, as well as causes network issues such as congestion and latency.

Various aspects of the present disclosure address at least the above by utilizing multicasting techniques to efficiently deliver updates or other messages to network infrastructure devices in a controller's domain. More precisely, various aspects create one or more multicast groups for the controller to send globe/updates, group-specific updates, and/or function-specific updates to the network infrastructure devices so that, e.g., new security filter information can be distributed in a more timely and less process intensive fashion. In one implementation, the controller may establish a secure relationship with a plurality of network infrastructure devices in its domain, and the controller may provide a multicast group address to the plurality of network infrastructure devices. Thereafter, when the controller detects an event (e.g., a security threat) and desires to provide a global or group-specific update (e.g., a new security filter), the controller may transmit a single multicast message to the plurality of network infrastructure devices in the multicast group, such that network congestion and latency is minimized when compared with conventional point-to-point approaches. This novel and previously unforeseen approach as well as other concepts associated with the present disclosure are described in greater detail below with reference to various examples and figures.

In one example in accordance with the present disclosure, a method for providing a security update to a plurality of network infrastructure devices is provided. The method comprises (i) establishing, by a controller, a secure channel with each of a plurality of network infrastructure devices; (ii) providing, by the controller, a multicast group address to each of the plurality of network infrastructure devices via the plurality of secure channels; and (iii) providing, by the controller, a security update to the plurality of network infrastructure devices via the plurality of secure channels and via a multicast message with the multicast group address set as the destination address.

In another example, a non-transitory machine-readable medium is provided. The non-transitory machine-readable medium comprises instructions which, when executed, cause a controller to (i) establish a secure channel with each of a plurality of network infrastructure devices, wherein the plurality of secure channels are at least to provide a multicast message from the controller to each of a plurality of network infrastructure devices, and wherein the plurality of network infrastructure devices are associated with a multicast group; (ii) detect a network event and, in response to the network event, generate a multicast message with the destination address set as a multicast group address associated with the multicast group; and (iii) provide the multicast message to the plurality of network infrastructure devices via the plurality of secure channels.

In still another example, a controller is provided. The controller comprises a management module to (i) establish a secure channel with a network infrastructure device; (ii) provide a multicast group address to the network infrastructure device via the secure channel; (iii) detect a network security event; and (iv) generate a security update to provide to the network infrastructure device via a multicast message with the destination address set to the multicast group address.

FIG. 1 depicts a block diagram of an example system 100 in accordance with an implementation. It should be readily apparent that the system 100 depicted in FIG. 1 represents a generalized illustration and that other components may be added or existing components may be removed, modified, or rearranged without departing from a scope of the present disclosure.

The system 100 comprises a controller 110 and a plurality of network infrastructure devices 120 (e.g., switches and/or access points). Depending on the implementation, the controller 110 may be a main controller, a security controller, or another type of function-specific controller. Moreover, depending on the implementation, the controller 110 and/or management module 130 therein may be in the form of hardware, machine-readable instructions, or a combination of both.

The controller 110 may be configured to operate in a SDN and/or in accordance with the OpenFlow specification. The control/et 110 may include a management module 130 that, among other things, may be responsible for (i) establishing a secure channel 140 with each network infrastructure device 120, (ii) providing a multicast group address to each network infrastructure device 120 via the established secure channels 140, (iii) detecting a network event (e.g., a security threat, network load issue, network congestion, etc.), (iv) generating an update 150 in the form of a multicast message 160 with the destination address set to the multicast group address, and/or (v) providing the multicast message 160 to each network infrastructure device 120 via the established secure channels 140. The update may comprise information related to allowed/prohibited activities, security filter updates, information regarding how to process specific flows (e.g., process, forward, disallow, drop, and/or redirect), and the like.

Figure 2:
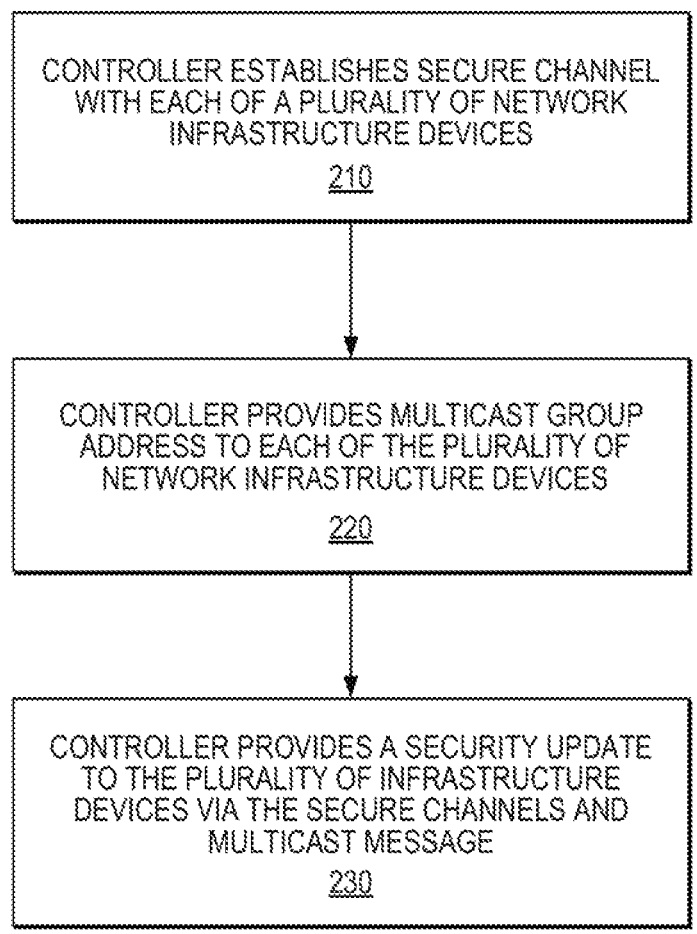
FIG. 2 depicts an example process flow diagram in accordance with an implementation.

FIG. 2 depicts an example process flow diagram 200 related to the system depicted in FIG. 1 in accordance with an implementation. It should be readily apparent that the processes depicted in FIG. 2 represent generalized illustrations, and that other processes may be added or existing processes may be removed, modified, or rearranged without departing from the scope and spirit of the present disclosure. In addition, it should be under that the processes may represent instructions stored on machine-readable storage medium that when executed may cause a controller to respond, to perform actions, to change states, and/or to make decisions. Alternatively or in addition, the processes may represent functions and/or actions performed by functionally equivalent circuits like an analog circuit, a digital signal processing device circuit, an application specific integrated circuit (ASIC), or other devices associated with a controller. Furthermore, as mentioned with respect to FIG. 1, these instructions and/or functionally equivalent circuits may be associated with a management module of the controller. Still further, FIG. 2 is not intended to limit the implementation of the present disclosure, but rather the figure illustrates functional information that one skilled in the art could use to design/fabricate circuits, generate machine-readable instructions, or use a combination of hardware and machine-readable instructions to perform the illustrated processes.

The process 200 may begin at block 210, when the controller establishes a secure channel with each of a plurality of network infrastructure devices. The secure channel may be resistant to overhearing and/or tampering, and may utilize encryption/decryption techniques. In some implementations, the establishment of the secure channel may occur in response to the controller receiving an instruction (e.g., from another controller or module) to establish a secure channel with at least one network infrastructure device. Furthermore, in some implementations, this secure channel may be for the purpose of delivering multicast messages, and may be in addition to other secure/unsecure channels setup between the controller and infrastructure devices.

After the controller establishes the secure channel with at least one network infrastructure device, at block 220, the controller provides a multicast group address to each of the plurality of network infrastructure devices via the plurality of secure channels. The multicast group address may be a logical identifier for a group of hosts in a computer network that are available to process datagrams or frames intended to be multicast for a designated network service. Moreover, the multicast address may allow the controller to send IP datagrams or frames to a group of interested network infrastructure devices in a single transmission. The multicast group address may be, for example, an Internet Protocol Version 4 (IPv4) multicast address (e.g., 10.110.135.51) and/or an Internet Protocol Version 6 (IPv6) multicast address (e.g., 2002:12d5:b8d7::10d4:b8d7). In addition to the multicast group address, the controller may provide the network infrastructure devices any keys necessary for decrypting messages on the multicast group address.

In some implementations, the controller may utilize a plurality of multicast groups for different functions. For example, the controller may utilize a first multicast group to efficiently deliver security updates or security filters to network infrastructure devices, and may utilize a second multicast group to efficiently deliver configuration information or quality of service (QoS) information to network infrastructure devices. Furthermore, in some implementations, the controller may alternatively or additionally utilize a plurality of multicast groups to deliver messages to a particular group or subset of network infrastructure devices. For example, the controller may utilize a first multicast group to deliver messages to edge switches, a second multicast group to deliver messages to indoor access points, a third multicast group to deliver messages to outdoor access points, and a fourth multicast group to deliver message to all switches and access points. Therefore, depending on the desired recipients (i.e., all network infrastructure devices or a subset of network infrastructure devices), the controller may select an appropriate multicast group to receive the message. This functionality could be used in conjunction with the function-specific groupings to, for example, deliver a function specific message (e.g., security update) to a particular group (e.g., indoor access points).

At block 230, the controller provides a security update to the plurality of network infrastructure devices via the plurality of secure channels and via a multicast message. In particular, the destination address of the multicast message is set to the above-mentioned multicast group address that was previously distributed to the network infrastructure devices. The controller may provide this security update in response to detecting a security threat or another event that necessitates a security update. For example, the controller may have detected or otherwise been informed of a threat to the network for any device that connects to www.badwebsite.com. The controller may therefore desire to provide a security update that causes the network infrastructure devices in the controller's domain (e.g., switches and/or access points) to redirect traffic if access to that website is attempted.

While the above example describes security updates, it should be understood that, in some implementations, the controller may provide non-security updates via the above-mentioned multicast technique. For example, during high usage of the network, the controller may desire to reduce the allowed rate for online video games. The controller may therefore generate and transmit a multicast message that indicates a maximum rate for a particular set of destination addresses or sockets. As a result, the load on the network may be controlled or balanced to an acceptable level.

Figure 3:
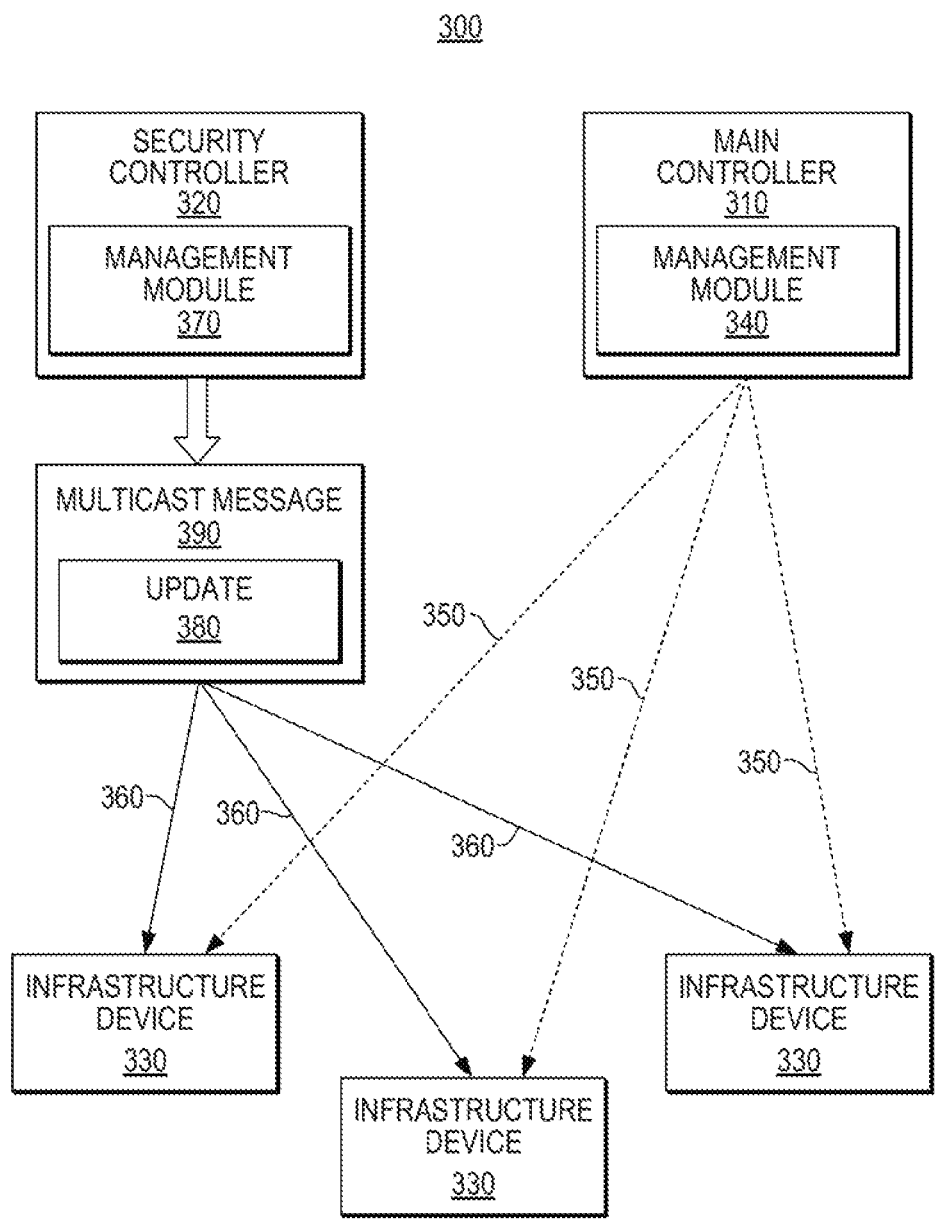
FIG. 3 depicts an another example system in accordance with an implementation.

FIG. 3 depicts an example of another system in accordance with an implementation. Similar to the description of the system in FIG. 1, it should be readily apparent that the system 300 depicted in FIG. 3 represents a generalized illustration and that other components may be added or existing components may be removed, modified, or rearranged without departing from a scope of the present disclosure.

The system 300 comprises a main controller 310, a security controller 320, and a plurality of network infrastructure devices 330 (e.g., switches and/or access points). Depending on the implementation, the main controller 310 and/or security controller 320 may be in the form of hardware, machine-readable instructions stored on a machine-readable medium, or a combination of both. Moreover, the main controller 310 and/or security controller 320 may be configured to operate in a SDN and/or in accordance with the OpenFlow specification. Still further, the main controller 310 and security controller 320 may be integrated in one device in some implementations, or discrete in two separate devices in other implementations.

The main controller 310 comprises a first management module 340 that, among other things, may (i) establish a secure channel 350 with each of the plurality of network infrastructure devices 330; (ii) exchange setup information with each of the plurality of network infrastructure devices 330 via the plurality of secure channels 350; and/or (iii) direct the security controller 320 and the plurality of network infrastructure devices 330 to establish a secure channel 360 and relationship with each other.

The security controller 320 comprises a second management module 370 that, among other things, may (i) establish a secure channel 360 with each network infrastructure device 330, (ii) provide a multicast group address to each network infrastructure device 330 via the established secure channels 360, (iii) detect a network event (e.g., a security threat, network load issue, network congestion, etc.), (iv) generate an update 380 in the form of a multicast message 390 with the destination address set to the multicast group address, and/or (v) provide the multicast message 390 to each network infrastructure device 330 via the established secure channels 360.

Figure 4:
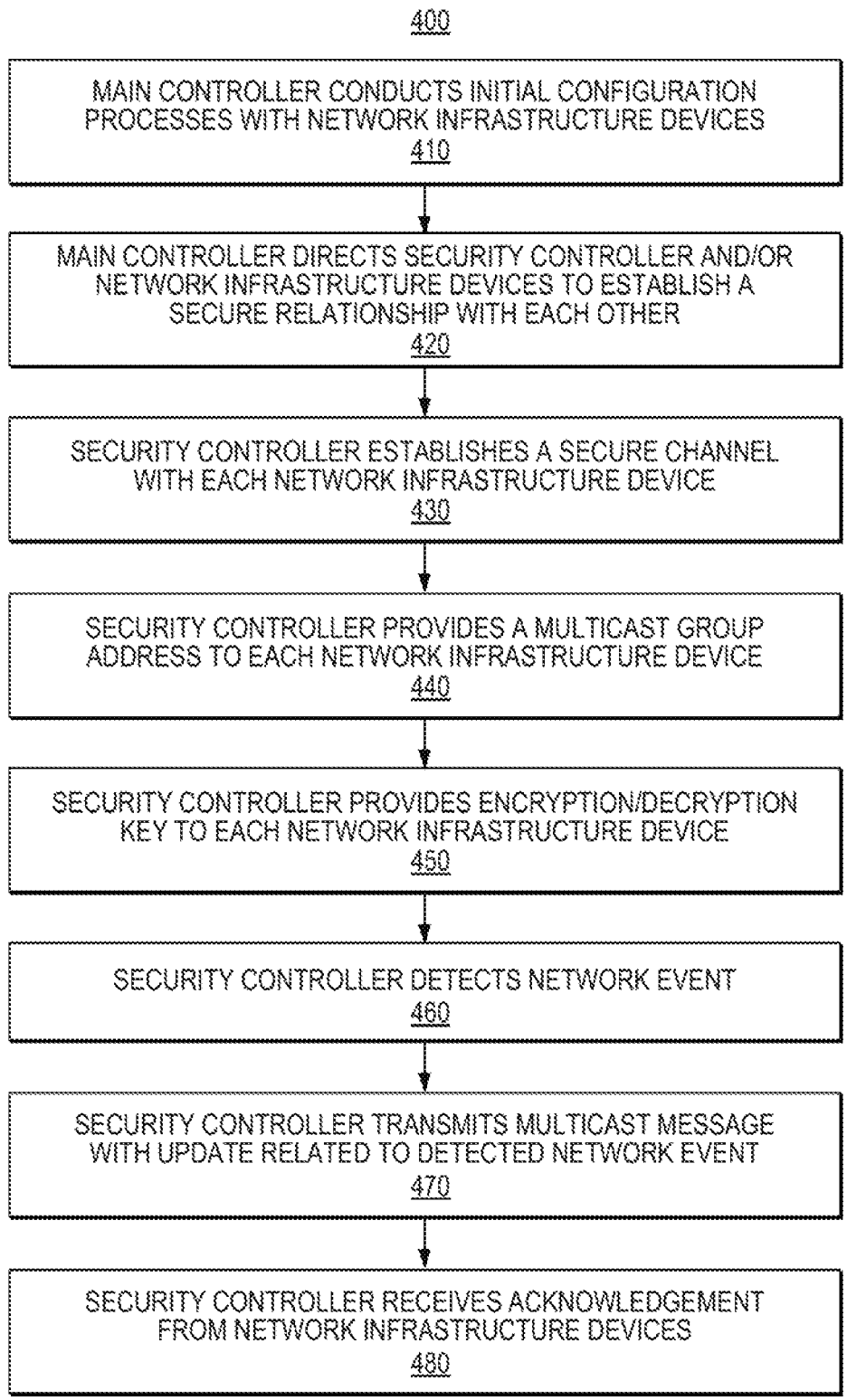
FIG. 4 depicts another example process flow diagram in accordance with an implementation.

FIG. 4 depicts an example process flow diagram 400 related to the system in FIG. 3 in accordance with an implementation. It should be readily apparent that the processes depicted in FIG. 4 represent generalized illustrations, and that other processes may be added or existing processes may be removed, modified, or rearranged without departing from the scope and spirit of the present disclosure. In addition, it should be understood that the processes may represent instructions stored on machine-readable storage medium that when executed may cause a main controller and/or security controller to respond, to perform actions, to change states, and/or to make decisions. Alternatively or in addition, the processes may represent functions and/or actions performed by functionally equivalent circuits like an analog circuit, a digital signal processing device circuit, an application specific integrated circuit (ASIC), or other devices associated with a main controller and/or a security controller. Furthermore, as mentioned with respect to FIG. 3, these instructions and/or functionally equivalent circuits may be associated with a management module of the main controller or security controller. Still further, FIG. 4 is not intended to limit the implementation of the present disclosure, but rather the figure illustrates functional information that one skilled in the art could use to design/fabricate circuits, generate software, or use a combination of hardware and software to perform the illustrated processes.

The process 400 may begin at block 410, when a main controller conducts initial configuration processes with network infrastructure devices. As part of this process, the main controller may build a secure relationship and a secure channel with each of the network infrastructure devices. That is, a one-to-one secure communication link may be established between the main controller and each of the network infrastructure devices. In addition, as part of this process, control and/or management information as well as security credentials may be exchanged between the main controller and each of the network infrastructure devices. These processes may be in response to the main controller and/or network infrastructure devices performing discovery operations and discovering one another.

At block 420, the main controller may direct the security controller and/or network infrastructure devices to establish a secure relationship with each other. In particular, the main controller may provide information about the security controller and/or network infrastructure devices to the security controller and/or network infrastructure devices, and command one or both to build a secure channel so that updates may be efficiently distributed in accordance with the above-mentioned multicast technique. As part of this process, main controller may also direct the network infrastructure devices to establish relationships with ether controllers besides the security controller.

At block 430, the security controller establishes a secure channel with each of a plurality of network infrastructure devices, as directed by the main controller, wherein the secure channel may be resistant to overhearing and/or tampering, and may utilize encryption/decryption techniques. Upon completion, each network infrastructure device may have a secure channel established with the main controller, and another secure channel established with the security controller.

At block 440, the security controller provides a multicast group address to each of the plurality of network infrastructure devices via the plurality of secure channels setup with the plurality of network infrastructure devices. As mentioned above, the multicast group address may be a logical identifier for a group of hosts in a computer network that are available to process datagrams or frames intended to be multicast for a designated network service. Moreover, the multicast address may allow the controller to send IP datagrams or frames to a group of interested network infrastructure devices in a single transmission. The multicast group address may be, for example, an Internet Protocol Version 4 (IPv4) multicast address (e.g., 10.110.135.51) and/or an Internet Protocol Version 6 (IPv6) multicast address (e.g., 2002:12d5:b8d7:10d4:b8d7), Furthermore, as mentioned above, the security controller may provide multiple multicast addresses to the plurality of network infrastructure devices. These multicast addresses may be function-specific and/or group specific in various implementations. For instance, the security controller may utilize a first multicast address for global security updates, a second multicast address for global non-security updates, a third multicast address for security updates to a subset of the network infrastructure devices (e.g., outdoor access points), and/or a fourth multicast address for non-security updates to the subset of network infrastructure devices.

At block 450, the security controller provides each network infrastructure device an encryption/decryption key to allow the network infrastructure device to encrypt/decrypt messages associated with the multicast group address(es).

At block 460, the security controller detects or otherwise becomes aware of a network event that requires an update to the plurality of network infrastructure devices. The network event may be, for example, a threat from a website (e.g., www.badwebsite.com), wherein the security controller needs to inform the network infrastructure devices to redirect any traffic directed to the website.

Thereafter, at block 470, the security controller transmits a multicast message with an update associated with the detected network event to the plurality of network infrastructure devices via the plurality of secure channels. The destination address of the multicast message is set to one of the above-mentioned multicast group address that was previously distributed to the network infrastructure devices.

At block 480, the security controller may receive an acknowledgement message from each network infrastructure device indicating that the multicast message was received and/or that appropriate action was taken by the network infrastructure device.

While FIG. 4 describes a security controller in communication with a main controller, it should be understood that other implementations may utilize other types of controllers in conjunction with or instead of the security controller. These controllers may similarly establish a secure channel with each network infrastructure device and deliver updates or other information to the network infrastructure devices via the above-mentioned multicast techniques. For instance, another controller may be included in the system to monitor network usage/congestion, and the controller may deliver a multicast message to network infrastructure devices in a multicast group in order to modify infrastructure device behavior in response to a detected event (e.g., network congestion).

Figure 5:
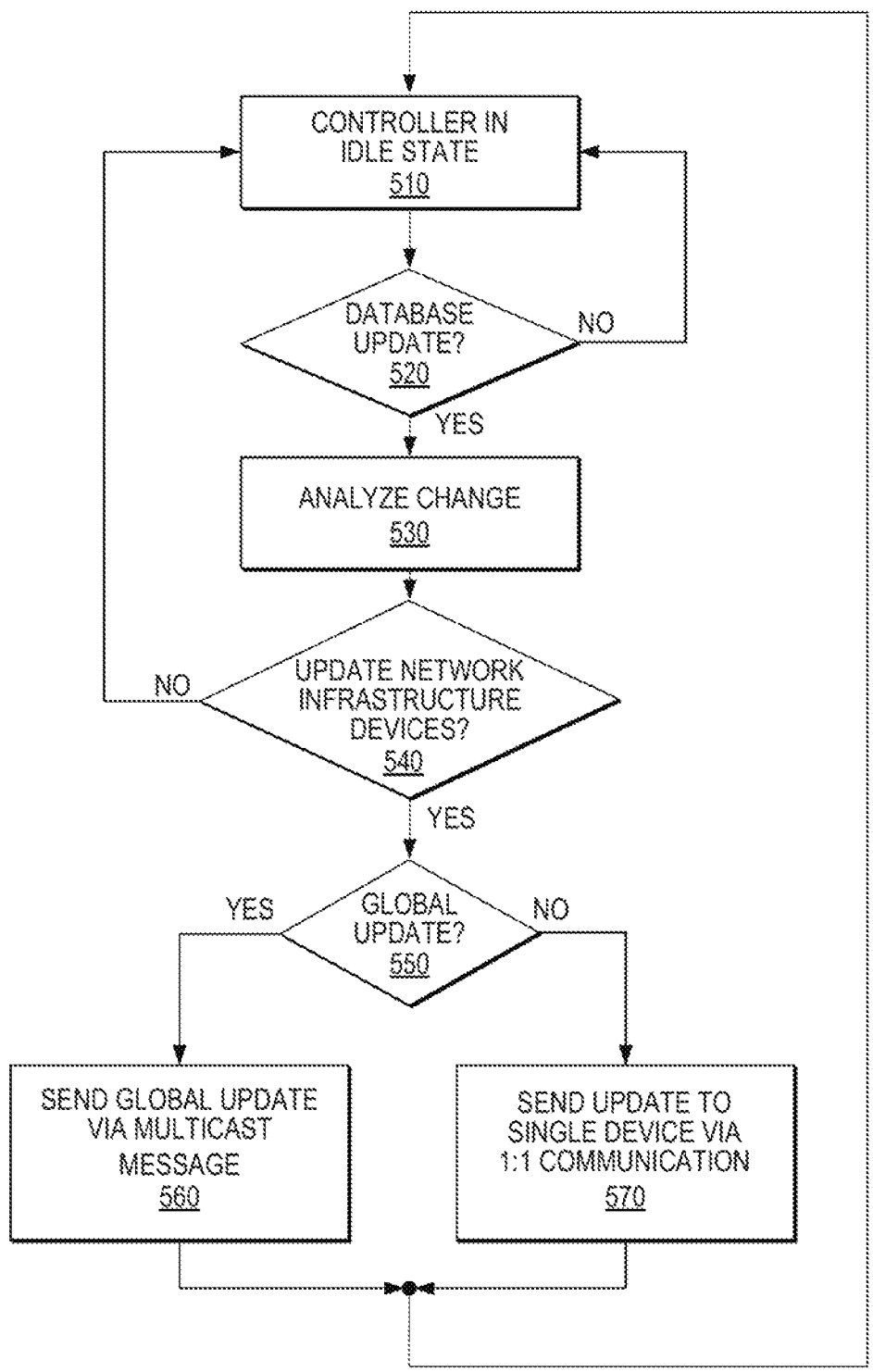
FIG. 5 depicts a further example process flow diagram in accordance with an implementation.

FIG. 5 depicts an example process flow diagram 500 in accordance with an implementation. In particular, FIG. 5 describes in more detail the processes that may occur at a controller to trigger the above-described multicast update in accordance with an implementation. It should be readily apparent that the processes depicted in FIG. 5 represent generalized illustrations, and that other processes may be added or existing processes may be removed, modified, or rearranged without departing from the scope and spirit of the present disclosure. In addition, it should be understood that the processes may represent instructions stored on machine-readable storage medium and/or functionally equivalent circuits.

The process may begin at block 510, when a controller (e.g., a security controller and/or main controller) is in an idle state (e.g., after being initialized). At block 520, the controller checks if a database update has occurred. The database may be, for example, an integrated or remote database accessible by the controller that includes information relevant to the network infrastructure devices (e.g., security parameters, DNS entries allowed/disallowed, etc.). If a database update has not occurred, the controller may go back to its idle state 510. If, however, a database update has occurred, the controller may analyze the change to the database at block 530. This analysis may comprise the controller determining the type of change, the cause of the change, the impact on the network and/or infrastructure device, and/or the threat associated with the change. Then, at block 540, the controller determines whether an update is necessary for the network infrastructure devices (e.g., access points and switches). If the controller determines that an update is not necessary, the controller may go back to its idle state 510. If, however, the controller determines that an update is necessary, the controller may transition to block 550 where the controller determines whether a global update or single device update is necessary. If the controller determines that a global update is necessary, the controller may send a global update to a plurality of network infrastructure devices that have joined a multicast group via a multicast message in accordance with the above-mentioned multicast techniques at block 560. If, on the other hand, the controller determines that a single device update is more appropriate, the controller may transmit the update via a one-to-one communication link with the single device. Of course, multiple such updates may be transmitted to multiple devices in a one-to-one manner if the controller determines that a multiple devices need to be notified and a global update is not necessary. Furthermore, while not shown, it should be understood that the controller may also opt to deliver an update in a non-global manner to a subset of network infrastructure devices by utilizing a multicast group directed to the subset (e.g., indoor access points, outdoor access points, etc.), as described in detail above.

Figure 6:
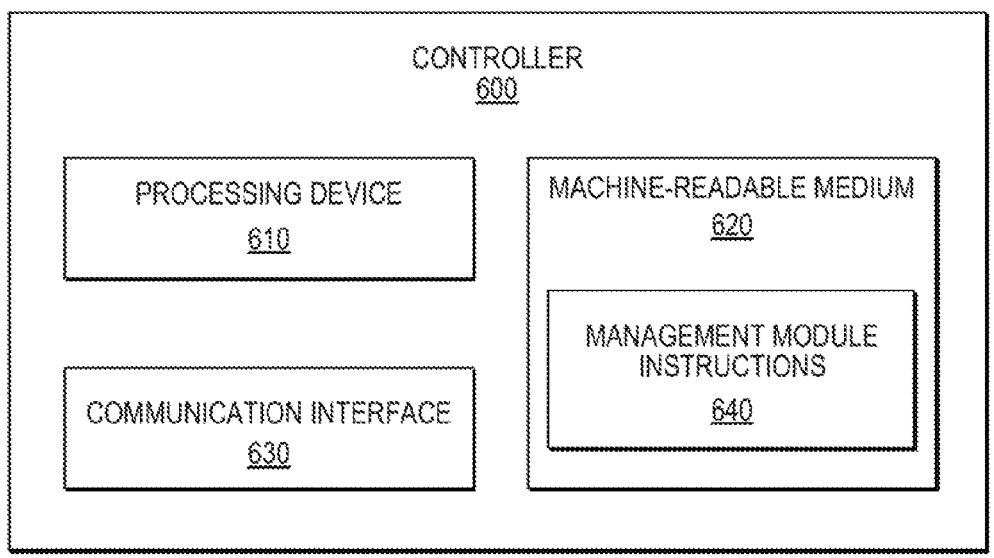
FIG. 6 depicts an example controller in accordance with an implementation.

FIG. 6 depicts an example controller 600 in accordance with an implementation. It should be readily apparent that the figure represents a generalized illustration and that other components may be added or existing components may be removed, modified, or rearranged without departing from a scope of the present disclosure. The controller 600 comprises a processing device 610, a machine-readable medium 620, and a communication interface 630, each of which is described in greater detail below.

The processing device 610 is to retrieve and execute instructions stored in the machine readable medium 620. The processing device 610 may be, for example, a processor, a central processing unit (CPU), a microcontroller, or the like. The machine readable medium 620 may be a non-transitory machine-readable medium to store machine readable instructions, codes, data, and/or other information (e.g., management module instructions 640 in accordance with the above-described embodiments). The machine readable medium 620 may be one or more of a non-volatile memory, a volatile memory, and or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In certain implementations, the machine readable medium 620 may be integrated with the processing device 610, while in other implementations, the machine readable medium 620 may be discrete from the processing device 610.

The communication interface 630 is to transmit and receive data. Such data may comprise at least the types of data described throughout this disclosure. The communication interface 630 may comprise one or more components such as, for example, transmitters, receivers, transceivers, antennas, ports, and/or PHYs. It should be understood that the communication interface 630 may comprise multiple interfaces, and that each may serve a different purpose (e.g., to interlace with another controller, to interlace with a switch, to interface with an access point, etc.).

The processing device 610 may be configured to execute code stored on the machine readable medium 620 to enable the controller to conduct operations discussed herein. For example, the processor 620 may execute the management module instructions 640 to cause the controller 600 to (i) establish a secure channel with each of a plurality of network infrastructure devices, wherein the secure channels are to at least provide a multicast message from the controller to each of a plurality of network infrastructure devices, and wherein the plurality of network infrastructure devices are associated with a multicast group; (II) detect a network event and, in response to the network event, generate a multicast message with the destination address set as a multicast group address associated with the multicast group; and (iii) provide the multicast message to the plurality of network infrastructure devices via the plurality of secure channels. In alternate implementations, the controller may utilize functionally equivalent circuits to conduct the above mentioned functions. For example, the controller device may include a communication interface and a circuit (e.g., an application specific integrated circuit (ASIC)).

The foregoing describes a novel and previously unforeseen approach to, e.g., utilize multicast groups to allow a controller in a SON to distribute updates to network infrastructure devices (e.g., switches and access points) so that information (e.g., new security filter information) can be distributed in a timely and process-sensitive fashion. The approach may reduce controller overhead, and give timely updates to devices in a controller's domain. The present disclosure has been shown and described with reference to the foregoing example implementations. However, it is to be understood that other forms, details, and implementations may be made without departing from the spirit and scope of the disclosure that is defined in the following claims.

What is claimed is:

1. A method for providing a security update to a plurality of network infrastructure devices, comprising:
   controlling communication parameters at a plurality of network infrastructure devices by a controller, wherein the network infrastructure devices include at least one of: a switch and an access point;
   establishing, by the controller, a plurality of secure channels to the corresponding network infrastructure devices;
   providing, by the controller, a multicast group address to each of the plurality of network infrastructure devices via the plurality of secure channels; and
   providing, by the controller, a security update to the plurality of network infrastructure devices via the plurality of secure channels and via a multicast message with the multicast group address set as a destination address,
   wherein the security update specifies at least one of: an allowed activity and a prohibited activity.

2. The method of claim 1, wherein the security update is provided by the controller in response to the controller detecting a security threat.

3. The method of claim 1, wherein the controller is a security controller, and wherein the method further comprises:
   establishing, by a main controller, a second secure channel with each of the plurality of network infrastructure devices;
   exchanging, by the main controller, setup information with each of the plurality of network infrastructure devices via the plurality of second secure channels; and
   directing, by the main controller, the security controller and the plurality of network infrastructure devices to establish a secure relationship with each other.

4. A non-transitory machine readable medium comprising instructions which, when executed, cause a controller to:
   control network activity at a plurality of network infrastructure devices using communication parameters, wherein the network infrastructure devices include at least one of: a switch and an access point;
   establish a plurality of secure channels with the corresponding network infrastructure devices, wherein the plurality of secure channels are at least to provide a multicast group address from the controller to each of the plurality of network infrastructure devices, and wherein the plurality of network infrastructure devices are associated with a multicast group;
   detect a network event and, in response to the network event, generate a multicast message with a destination address set as the multicast group address associated with the multicast group; and
   provide the multicast message to the plurality of network infrastructure devices,
   wherein the network event is a security event and wherein the multicast message comprises a security update that specifies at least one of: an allowed activity and a prohibited activity.

5. The non-transitory machine readable medium of claim 4, comprising further instructions which, when executed, cause the controller to provide a multicast group address to each of the plurality of network infrastructure devices via the plurality of secure channels.

6. The non-transitory machine readable medium of claim 4, comprising further instructions which, when executed, cause the controller to provide a plurality of multicast group addresses to each of the plurality of network infrastructure devices via the plurality of secure channels, wherein each multicast group address is associated with a multicast group associated with a different update function.

7. The non-transitory machine readable medium of claim 4, comprising further instructions which, when executed, cause the controller to provide a decryption key to each of the plurality of network infrastructure devices via the plurality of secure channels, wherein the decryption key is utilized to decrypt at least a portion of the multicast message.

8. A controller comprising a physical processing device and a tangible non-transitory machine-readable medium including instructions that when executed by the physical processing device, cause the controller to:
   control communication parameters at a plurality of network infrastructure devices, wherein the network infrastructure devices include at least one of: a switch and an access point;
   establish a secure channel with one of the network infrastructure devices;
   provide a multicast group address to the one network infrastructure device via the secure channel;
   detect a network security event; and
   generate a security update to provide to the one network infrastructure device via a multicast message with a destination address set to the multicast group address,
   wherein the security update specifies at least one of: an allowed activity and a prohibited activity.

9. The controller of claim 8, wherein the multicast group address is associated with a subset of a plurality of network infrastructure devices or with all of a plurality of network infrastructure devices.

10. The system of claim 8, wherein the management module is further to communicate the multicast message to the network infrastructure device via the secure channel.

11. The method of claim 1, further comprising:
providing, by the controller, a decryption key to one of the plurality of network infrastructure devices via the corresponding secure channel,
wherein the decryption key is utilized to decrypt at least a portion of the multicast message at the one network infrastructure device.

12. The controller of claim 8, wherein the controller is further caused to:
provide a decryption key to the one network infrastructure device via the secure channel,
wherein the decryption key is utilized to decrypt at least a portion of the multicast message at the one network infrastructure device.

13. The controller of claim 1, wherein a plurality of the one of the parameters is included in the multicast message.

14. The controller of claim 4, wherein one of the communication parameters is included in the multicast message.

15. The controller of claim 8, wherein the security update includes one of the communication parameters.

* * * * *